United States Patent
Silverman et al.

(10) Patent No.: US 12,301,385 B2
(45) Date of Patent: May 13, 2025

(54) PHASE LOCK LOOP PHASE AMBIGUITY MITIGATION FOR MULTI-LINK OPERATION EXTRAPOLATED SOUNDING

(71) Applicant: Cisco Technology, Inc., San Jose, CA (US)

(72) Inventors: Matthew Aaron Silverman, Shaker Heights, OH (US); Malcolm Muir Smith, Richardson, TX (US); Brian Donald Hart, Sunnyvale, CA (US); Indermeet Singh Gandhi, San Jose, CA (US); John Matthew Swartz, Lithia, FL (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 18/356,550

(22) Filed: Jul. 21, 2023

(65) Prior Publication Data

US 2024/0380640 A1    Nov. 14, 2024

Related U.S. Application Data

(60) Provisional application No. 63/501,602, filed on May 11, 2023.

(51) Int. Cl.
*H04L 25/02*    (2006.01)
*H04W 88/08*    (2009.01)

(52) U.S. Cl.
CPC ...... *H04L 25/0212* (2013.01); *H04L 25/0228* (2013.01); *H04W 88/08* (2013.01)

(58) Field of Classification Search
CPC . H04L 25/0212; H04L 25/0228; H04W 88/08
See application file for complete search history.

(56) References Cited

U.S. PATENT DOCUMENTS

| | | | |
|---|---|---|---|
| 11,336,487 B1 | 5/2022 | Dakshinkar et al. | |
| 2012/0099660 A1* | 4/2012 | Mun | H04L 1/0057 375/E7.2 |

(Continued)

FOREIGN PATENT DOCUMENTS

WO    2022/076726 A1    4/2022

OTHER PUBLICATIONS

International Search Report and Written Opinion for International Application No. PCT/US2024/027140, mailed Sep. 9, 2024, 13 Pages.

(Continued)

*Primary Examiner* — Janice N Tieu
(74) *Attorney, Agent, or Firm* — Polsinelli P.C.

(57) ABSTRACT

The present disclosure is directed to simultaneous channel sounding on multiple MLO channels followed by determining phase and amplitude corrections based on channel impulse responses obtained on each MLO channel. The corrections are then used in subsequent extrapolation of channel sounding on one channel to another. In one aspect, a method includes transmitting, on each radio interface of a first multi-link device, a corresponding sounding probe to a second multi-link device; determining, by each radio interface of the first multi-link device, a corresponding channel impulse response based on the corresponding sound probe to yield a plurality of channel impulse responses; determining an offset between the plurality of channel impulse responses; and using the offset during a subsequent extrapolation of a sounding probe on one radio interface to a second radio interface of the first multi-link device.

20 Claims, 7 Drawing Sheets

(56) References Cited

U.S. PATENT DOCUMENTS

| | | |
|---|---|---|
| 2017/0331605 A1 | 11/2017 | Shani et al. |
| 2018/0054382 A1 | 2/2018 | Luo et al. |
| 2019/0332139 A1 | 10/2019 | Rapeta et al. |
| 2021/0044472 A1 | 2/2021 | Dorosenco et al. |
| 2022/0116179 A1 | 4/2022 | Cao et al. |
| 2023/0013565 A1 | 1/2023 | Sjöland et al. |
| 2023/0088404 A1* | 3/2023 | Shafin .................. H04L 5/0057 370/329 |
| 2023/0093300 A1* | 3/2023 | Tanaka ................ H04B 7/0626 370/329 |

OTHER PUBLICATIONS

Naribole S (Samsung)., et al., "MLD Spatial Multiplexing Considerations", 11-20-0977-02-00be-mld-spatial-multiplexing-considerations, IEEE-SA Mentor, Piscataway, NJ USA, vol. 802.11 EHT, 802.11be, No. 2, Aug. 18, 2020, doc.: IEEE 802.11-20/0977r2, Jul. 15, 2020, pp. 1-18, XP068172949, Retrieved from https://mentor.IEEE.org/802.11/dcn/20/11-20-0977-01-00be-mld-spatial-multiplexing-considerations.pptx on 2020-08-18, The whole document.

Analog Devices: "Fundamentals of Phase Locked Loops (PLLs)", analog.com, MT-086 Tutorial, 2009, Jun. 27, 2023 pp. 1-10.

\* cited by examiner

PHASE LOCK LOOP PHASE AMBIGUITY MITIGATION FOR MULTI-LINK OPERATION EXTRAPOLATED SOUNDING

RELATED APPLICATION DATA

This application claims priority to U.S. Provisional Application No. 63/501,602 filed on May 11, 2023, the entire content of which is incorporated herein by reference.

TECHNICAL FIELD

The present disclosure relates to wireless communication systems operating using Multi-Link Operation technology, and in particular to correcting phase and amplitude offsets between multiple links for use in channel sounding extrapolation.

BACKGROUND

Multi-Link Operation (MLO) is a Wi-Fi technology that enables devices connected to a WiFi access point (AP) to simultaneously send and/or receive data across different frequency bands and channels.

Channel sounding is a technique that evaluates the radio environment for wireless communication, especially Multiple Input Multiple Output (MIMO) systems, an example of which is an MLO-based WiFi system. Because of the effect of terrain and obstacles, wireless signals propagate in multiple paths (the multipath effect). To minimize or use the multipath effect, channel sounding is used to process the multidimensional spatial-temporal signal and estimate channel characteristics. The estimated channel characteristics can be used to simulate and design wireless systems.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
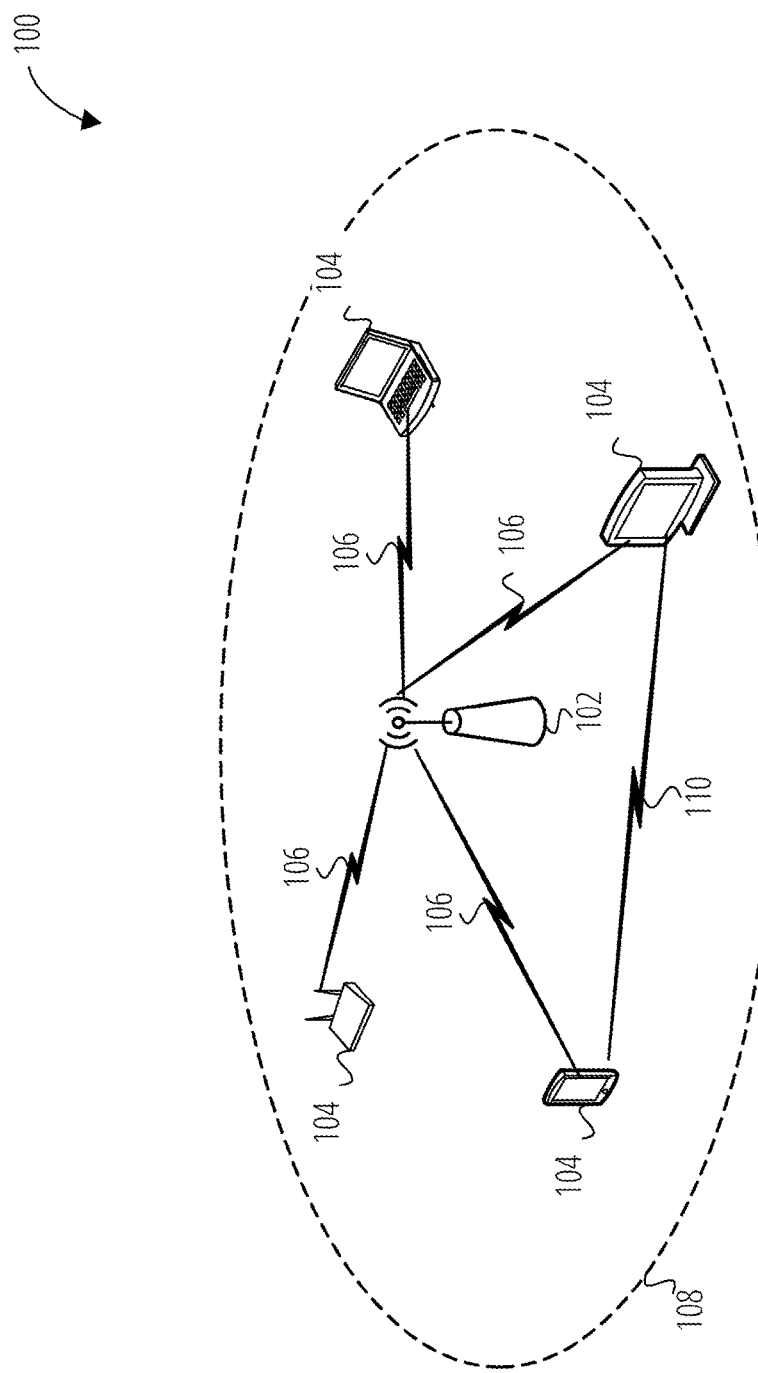
FIG. 1 shows a block diagram of an example wireless communication network according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

A used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure are directed to techniques for correcting random phase values caused by clock dividers in Phase Lock Loops (PLL) components that are present in radio interfaces of a Multi-Link Operation (MLO) device. These random phase values hinder the ability to extrapolate channel sounding on one MLO channel to another. The proposed techniques utilize simultaneous channel sounding on multiple MLO channels followed by determining phase and amplitude corrections based on channel impulse responses obtained on each MLO channel. The corrections are then used in subsequent extrapolation of channel sounding on one channel to another.

In one aspect, a method includes transmitting, on each radio interface of a first multi-link device, a corresponding sounding probe to a second multi-link device; determining, by each radio interface of the first multi-link device, a corresponding channel impulse response based on the corresponding sound probe to yield a plurality of channel impulse responses; determining an offset between the plurality of channel impulse responses; and using the offset during a subsequent extrapolation of a sounding probe on one radio interface to a second radio interface of the first multi-link device.

In another aspect, determining the corresponding channel impulse response include receiving a corresponding explicit feedback from the second multi-link device for each corresponding sounding probe; and converting the corresponding explicit feedback to the corresponding channel impulse response.

In another aspect, the offset includes a group delay and a phase offset associated with the plurality of channel impulse responses.

In another aspect, the method further includes converting the offset into a frequency domain; and representing the offset, after conversion into the frequency domain, as an offset between a pair of radio interfaces over a subcarrier frequency.

In another aspect, the method further includes determining that inter-radio calibration is triggered; and transmitting the corresponding sounding probe each radio interface based on determining that the inter-radio calibration is triggered, the triggering being based on one or more of a shut down of the first multi-link device, a power up of the first multi-link device, a frequency channel change of the first multi-link device, and an environmental condition mandate.

In another aspect, the corresponding sounding probe is transmitted simultaneously on all radio interfaces of the first multi-link device.

In another aspect, each of the first multi-link device and the second multi-link device is one of an access point multi-link device or a non-access point multi-link device.

In one aspect, a multi-link device includes one or more memories having computer-readable instructions stored therein and one or more processors. The one or more processors are configured to execute the computer-readable instructions to transmit, on each radio interface of the multi-link device, a corresponding sounding probe to a different multi-link device; determine, by each radio interface of the multi-link device, a corresponding channel impulse response based on the corresponding sound probe to yield a plurality of channel impulse responses; determine an offset between the plurality of channel impulse responses; and use the offset during a subsequent extrapolation of a sounding probe on one radio interface to a second radio interface of the multi-link device.

In one aspect, one or more non-transitory computer-readable media include computer-readable instructions, which when executed by one or more processors of a first multi-link device, cause the first multi-link device to transmit, on each radio interface of the first multi-link device, a corresponding sounding probe to a second multi-link device; determine, by each radio interface of the first multi-link device, a corresponding channel impulse response based on the corresponding sound probe to yield a plurality of channel impulse responses; determine an offset between the plurality of channel impulse responses; and use the offset during a subsequent extrapolation of a sounding probe on one radio interface to a second radio interface of the first multi-link device.

Example Embodiments

IEEE 802.11, commonly referred to as Wi-Fi, has been around for three decades and has become arguably one of the most popular wireless communication standards, with billions of devices supporting more than half of the worldwide wireless traffic. The increasing user demands in terms of throughput, capacity, latency, spectrum and power efficiency calls for updates or amendments to the standard to keep up with them. As such, Wi-Fi generally has a new amendment after every 5 years with its own characteristic features. In the earlier generations, the focus was primarily higher data rates, but with ever increasing density of devices, area efficiency has become a major concern for Wi-Fi networks. Due to this issue, the last (802.11 be (Wi-Fi 7)) amendments focused more on efficiency. The next expected update to IEEE 802.11 is coined as Wi-Fi 8. Wi-Fi 8 will attempt to further enhance throughput and minimize latency to meet the ever growing demand for the Internet of Things (IoT), high resolution video streaming, low-latency wireless services, etc.

Multiple Access Point (AP) coordination and transmission in Wi-Fi refers to the management of multiple access points in a wireless network to avoid interference and ensure efficient communication between the client devices and the network. When multiple access points are deployed in a network—for instance in buildings and office complexes—they operate on the same radio frequency, which can cause interference and degrade the network performance. To mitigate this issue, access points can be configured to coordinate their transmissions and avoid overlapping channels.

Wi-Fi 7 introduced the concept of multi-link operation (MLO), which gives the devices (Access Points (APs) and Stations (STAs)) the capability to operate on multiple links (or even bands) at the same time. MLO introduces a new paradigm to multi-AP coordination which was not part of the earlier coordination approaches. MLO is considered in Wi-Fi-7 to improve the throughput of the network and address the latency issues by allowing devices to use multiple links.

A multi-link device (MLD) may have several "affiliated" devices, each affiliated device having a separate PHY interface, and the MLD having a single link to the Logical Link Control (LLC) layer. In the proposed IEEE 802.11 be draft, a multi-link device (MLD) is defined as: "A device that is a logical entity and has more than one affiliated station (STA) and has a single medium access control (MAC) service access point (SAP) to logical link control (LLC), which includes one MAC data service" (see: LAN/MAN Standards Committee of the IEEE Computer Society, Amendment 8: Enhancements for extremely high throughput (EHT), IEEE P802.11 Be™/D0.1, September 2020, section 3.2). Connection(s) with an MLD on the affiliated devices may occur independently or jointly. A preliminary definition and scope of a multi-link element is described in section 9.4.2.247b of aforementioned IEEE 802.11 be draft. An idea behind this information element/container is to provide a way for multi-link devices (MLDs) to share the capabilities of different links with each other and facilitate the discovery and association processes. However, this information element may still be changed or new mechanisms may be introduced to share the MLO information (e.g. related to backhaul usage).

In multi-link operation (MLO) both STA and APs can possess multiple links that can be simultaneously active. These links may or may not use the same bands/channels.

MLO allows sending PHY protocol data units (PPDUs) on more than one link between a STA and an AP. The links may be carried on different channels, which may be in different frequency bands. Based on the frequency band and/or channel separation and filter performance, there may be restrictions on the way the PPDUs are sent on each of the links.

MLO may include a basic transmission mode, an asynchronous transmission mode, and a synchronous transmission mode.

In a basic transmission mode, there may be multiple primary links, but a device may transmit PPDU on one link at a time. The link for transmission may be selected as follows. The device (such as an AP or a STA) may count down a random back off (RBO) on both links and select a link that wins the medium for transmission. The other link may be blocked by in-device interference. In basic transmission mode, aggregation gains may not be achieved.

In an asynchronous transmission mode, a device may count down the RBO on both links and perform PPDU transmission independently on each link. The asynchronous transmission mode may be used when the device can support simultaneous transmission and reception with bands that have sufficient frequency separation such as separation between the 2.4 GHz band and the 5 GHz band. The asynchronous transmission mode may provide both latency and aggregation gains.

In a synchronous PPDU transmission mode, the device may count down the RBO on both links. If a first link wins the medium, both links may transmit PPDUs at the same time. The transmission at the same time may minimize in-device interference and may provide both latency and aggregation gains.

Multi-AP coordination and MLO are two features proposed to improve the performance of Wi-Fi networks in the upcoming IEEE 802.11 be amendment. Multi-AP coordination is directed toward utilizing (distributed) coordination between different APs to reduce inter-Basic Service Set (BSS) interference for improved spectrum utilization in dense deployments. MLO, on the other hand, supports high data rates and low latency by leveraging flexible resource utilization offered by the use of multiple links for the same device.

FIG. 1 shows a block diagram of an example wireless communication network according to some aspects of the present disclosure. Wireless communication network 100 can be an example of a wireless local area network (WLAN) such as a Wi-Fi network (and will hereinafter be referred to as WLAN 100). For example, WLAN 100 can be a Wi-Fi network operating based on any currently available or to be developed IEEE 802.11 protocols and standards (e.g., 802.11 ay, 802.11 ax, 802.11az, 802.11ba and 802.11be, etc.). WLAN 100 may include wireless communication devices such as an AP 102 and multiple STAs 104. The number of APs and STAs are not limited to that shown in FIG. 1 and can be more or less. Any one or more of AP 102 and STAs 104 may be capable of MLO (multi-link reception and/or transmission).

Each of STAs 104 can be any one or more of mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHZ, 5 GHZ, 6 GHZ or 60 GHZ bands). Passive scans entail an STA 104 listening for beacons transmitted by AP 102 at a periodic time interval referred to as the target beacon transmission time (TBTT) (measured in time units (TUs) where one TU may be equal to 1024 microseconds (μs)). Active scans entail an STA 104 generating and sequentially transmitting probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with a selected AP 102. AP 102 assigns an association identifier to STA 104 at the conclusion of the association operations, which AP 102 can then utilize to track STA 104.

As a result of the increasing ubiquity of wireless networks, an STA 104 may have the opportunity to select one of many APs 102 within range of the STA or to select among multiple APs 102 that together form an extended service set (ESS) including multiple connected APs 102. An extended network station associated with WLAN 100 may be connected to a wired or wireless distribution system that may allow multiple APs 102 to be connected in such an ESS. As such, an STA 104 can be covered by more than one AP 102 and can associate with different APs 102 at different times for different transmissions. Additionally, after association with an AP 102, an STA 104 also may be configured to periodically scan its surroundings to find a more suitable AP 102 with which to associate. For example, an STA 104 that is moving relative to its associated AP 102 may perform a roaming scan to find another AP 102 having more desirable network characteristics such as a greater received signal strength indicator (RSSI), a reduced traffic load, etc.

In some cases, STAs 104 may form ad-hoc networks without APs 102. In some examples, ad hoc networks may be implemented within a larger wireless network such as WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication direct wireless link 110 regardless of whether both STAs 104 are associated with and served by same AP 102. In such an ad hoc system, one or more of STAs 104 may assume the role filled by AP 102 in a BSS. Such an STA 104 may coordinate transmissions within the ad hoc network. Examples of direct wireless links 110 include Wi-Fi Direct connections, connections established by using a Wi-Fi Tunneled Direct Link Setup (TDLS) link, and/or any other known or to be developed direct wireless communication scheme.

APs 102 and STAs 104 may function and communicate (via the respective communication links 106) according to the IEEE 802.11 family of wireless communication protocol standards. AP 102 and STAs 104 in WLAN 100 may transmit PPDUs over an unlicensed spectrum that can include frequency bands used by Wi-Fi technology, such as the 2.4 GHz band, the 5 GHz band, the 60 GHz band, the 3.6 GHz band, and the 900 MHz band. Some implementations of AP 102 and STAs 104 described herein also may communicate in other frequency bands, such as the 6 GHz band, which may support both licensed and unlicensed communications. AP 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHZ, or 6 GHz bands, each of which can be divided into multiple 20 MHz channels. PPDUs can be transmitted over a physical channel having a minimum bandwidth of 20 MHz or larger channels having bandwidths of 40 MHZ, 80 MHZ, 160 or 320 MHz, etc., which can be formed by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
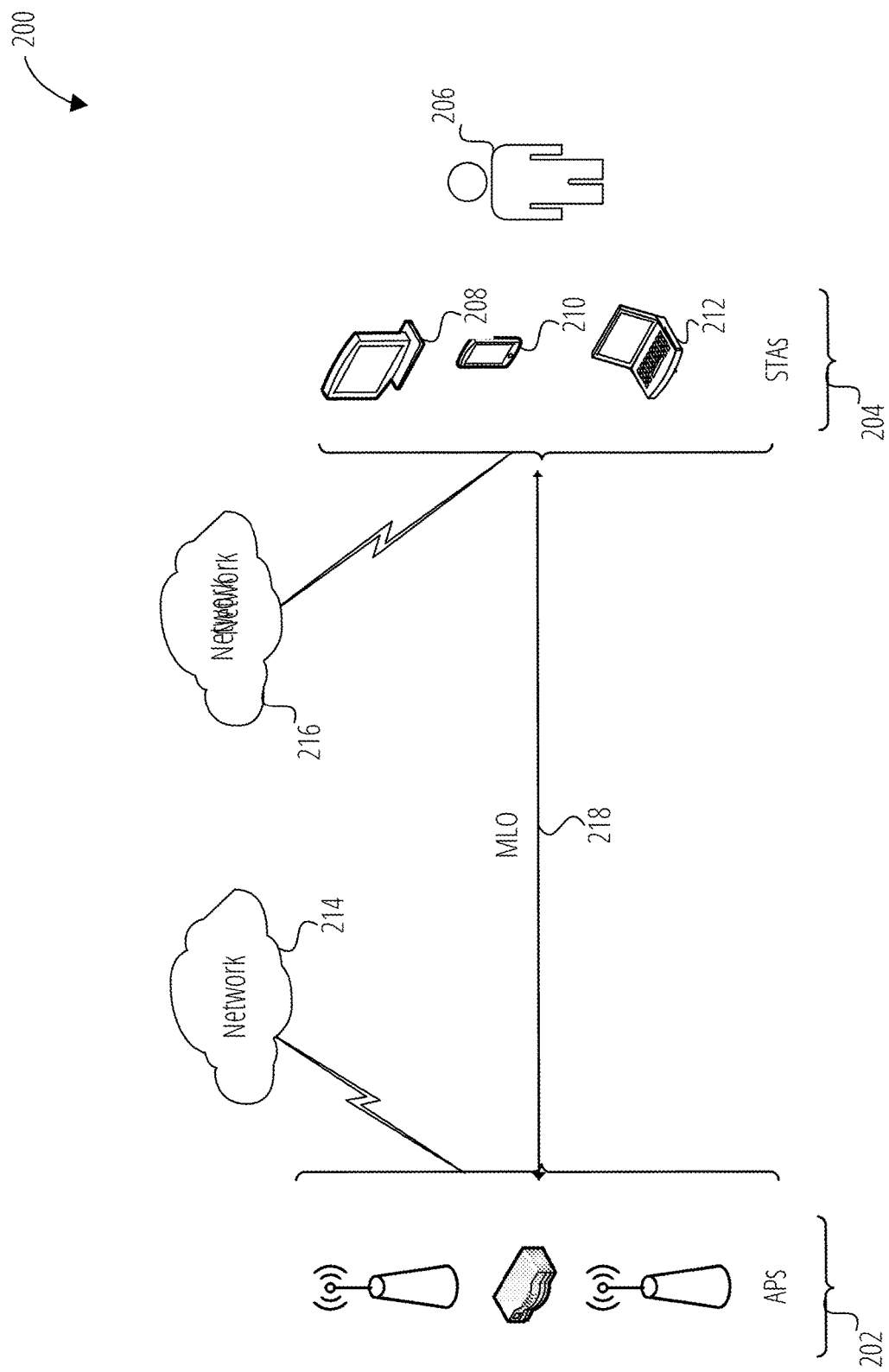
FIG. 2A is a network diagram illustrating an example network environment of multi-link operation, according to some aspects of the present disclosure.

FIG. 2A is a network diagram illustrating an example network environment of multi-link operation, according to some aspects of the present disclosure. Wireless network 200 may include one or more STAs 204 (includes example devices 208, 210, and 212) and one or more APs 202, which may communicate in accordance with IEEE 802.11 communication standards. STAs 204 and APs 202 may be the same as STAs 104 and AP 102 of FIG. 1, respectively.

One or more STAs 204 and/or APs 202 may be operable by one or more user(s) 206.

STAs 204 and/or APs 202 may also include mesh stations in, for example, a mesh network, in accordance with one or more IEEE 802.11 standards and/or 3GPP standards.

Any of STAs 204 and APs 202 may be configured to communicate with each other via one or more communications networks 214 and/or networks 216, which may be the same as WLAN 100. STAs 204 may also communicate peer-to-peer or directly with each other with or without APs 202. Any of the communications networks 214 and/or networks 216 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 214 and/or networks 214 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 214 and/or networks 216 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 204 and APs 202 may be configured to perform directional transmission and/or directional reception in conjunction with wirelessly communicating in a wireless network. Any of STAs 204 and APs 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 204 and APs 202 may be configured to perform any given directional transmission towards one or more defined transmit sectors. Any of STAs 204 and APs 202 may be configured to perform any given directional reception from one or more defined receive sectors.

Multiple Input-Multiple Output (MIMO) beamforming in a wireless network may be accomplished using RF beamforming and/or digital beamforming. In some embodiments, in performing a given MIMO transmission, STAs 204 and/or APs 202 may be configured to use all or a subset of its one or more communications antennas to perform MIMO beamforming.

Any of STAs 204 and APs 202 may include any suitable radio and/or transceiver for transmitting and/or receiving radio frequency (RF) signals in the bandwidth and/or channels corresponding to the communications protocols utilized by any of STAs 204 and APs 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In example embodiments, the radio component, in cooperation with the communications antennas, may be configured to communicate via 2.4 GHz channels (e.g., 802.11b, 802.11g. 802.11n, 802.11ax), 5 GHz channels (e.g., 802.11n, 802.11ac, 802.11ax), or 60 GHZ channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some examples, and with reference to FIG. 1, APs 102 may facilitate multi-link operation 218 with one or more STAs 220.

In one example, multi-link operation 218 may have a single-radio non-access point MLD (non-AP MLD, e.g. an STA 204) listen to two or more channels simultaneously by (1) configuring a 2×2 Tx/Rx (or M×M Tx/Rx) to allocate a 1×1 resource on each channel/band (e.g., 5 GHZ and 6 GHZ), (2) add extra Rx modules, or (3) add wake-up receivers. An AP MLD then transmits on any idle channel a control frame (e.g., request to send (RTS) or multi-user (MU) RTS) before either a single data frame or a group of data frames within a single transmit opportunity (TXOP) to indicate that frames will be transmitted on that channel. The non-AP MLD responds back with a control frame (e.g., clear to send (CTS)). The single-radio non-AP MLD configures its radio back to 2×2 Tx/Rx module on the channel it received the control frame from the AP MLD and receives data. When using a wake-up receiver (802.11ba), the AP MLD transmits a wake-up packet. This also could be extended to other architectures with different antenna configurations. As example, a device with 3×3, when in that case a 2×2 resource on one channel and a 1×1 on another channel.

In one example, a multi-link operation 218 may enable a single-radio non-AP MLD to achieve throughput enhancement and latency reduction in a busy network without needing to implement a concurrent dual-radio, thus significantly reducing device cost.

Figure 2B:
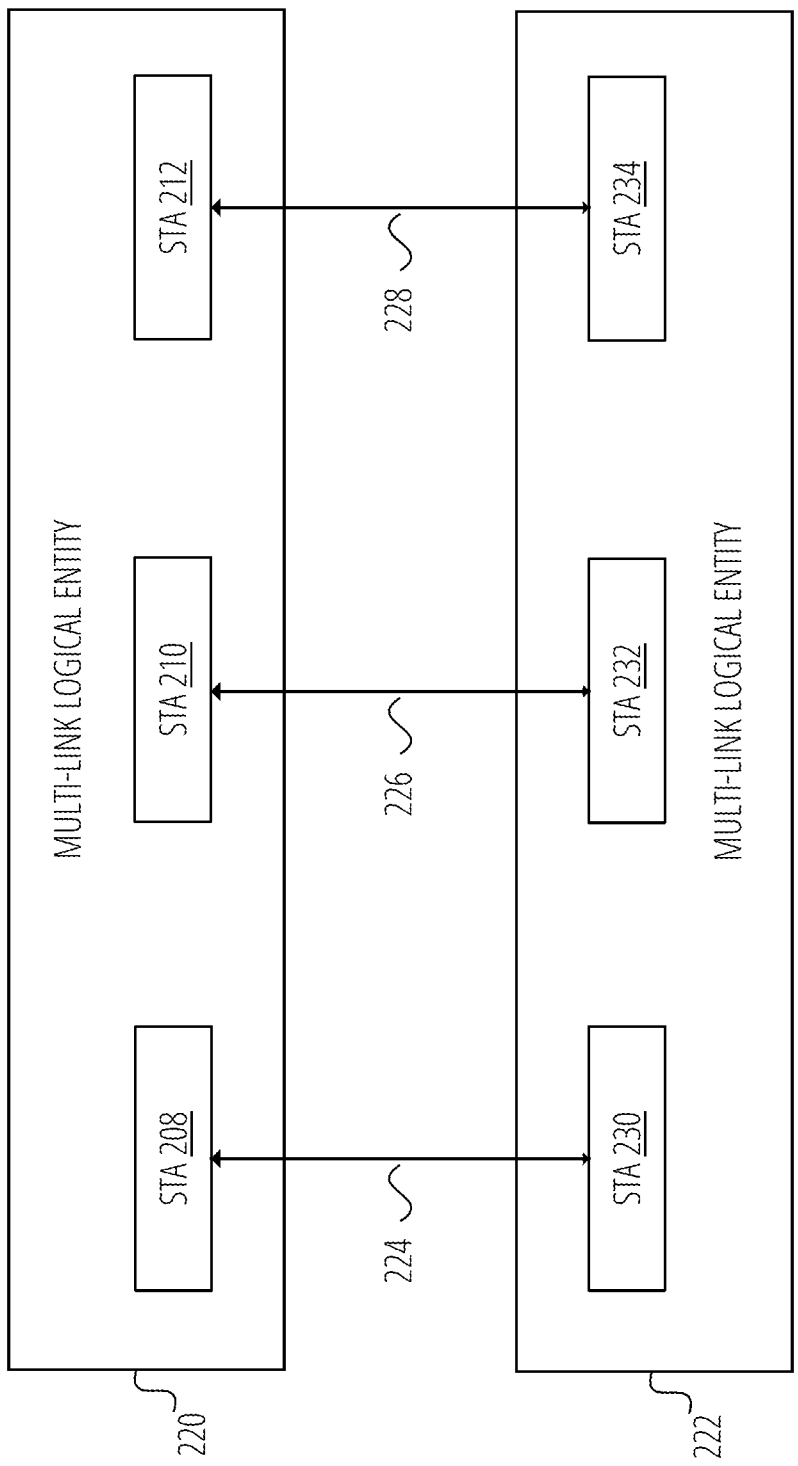
FIG. 2B depicts an illustrative schematic diagram for multi-link operation between two logical entities, according to some aspects of the present disclosure.

FIG. 2B depicts an illustrative schematic diagram for multi-link operation between two logical entities, in accordance with one or more example embodiments of the present disclosure.

Referring to FIG. 2B, there are shown two multi-link logical entities 220 and 222 that can set up communication links 224, 226, and 228 with each other. A multi-link logical entity 220 or 222 may be a logical entity that contains one or more STAs such as STAs 204. The logical entity has one MAC data service interface and primitives to the logical link control (LLC) and a single address associated with the interface, which can be used to communicate on the distribution system medium (DSM). It should be noted that a Multi-link logical entity allows STAs within the multi-link logical entity to have the same MAC address. It should also be noted that the exact name can be changed.

In this example of FIG. 2B, multi-link logical entity 220 and multi-link logical entity 222 may be two separate physical devices, where each one comprises a number of virtual or logical devices. For example, multi-link logical entity 220 may comprise three STAs such as STAs 208, 210, and 212. Multi-link logical entity 222 may include another three STAs (e.g., STAs 230, 232, and 234). In one example, STA 208 may communicate with STA 230 over link 224, STA 210 may communicate with STA 232 over link 226, and STA 212 may communicate with STA 234 over link 228.

Figure 2C:
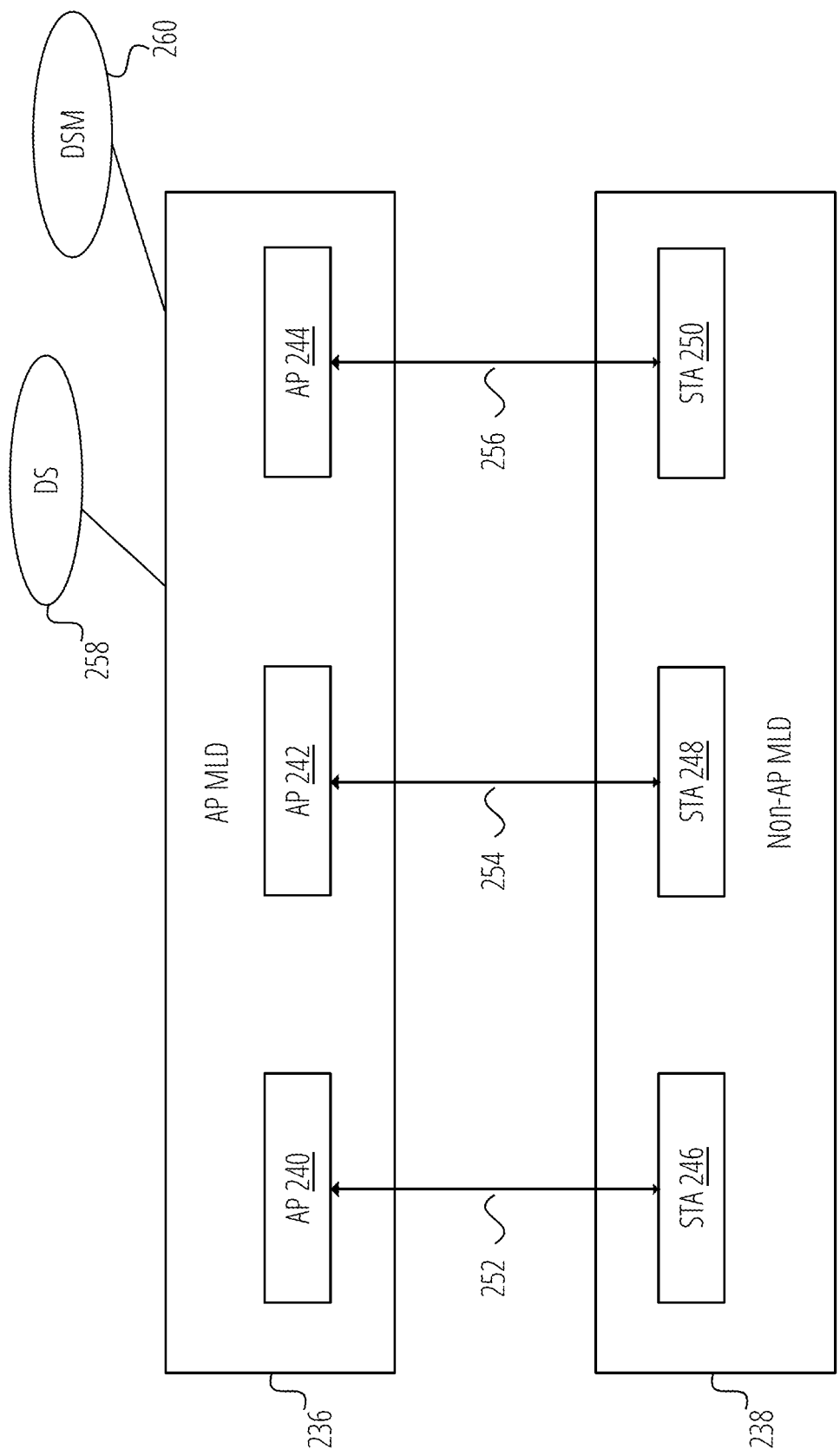
FIG. 2C depicts an illustrative schematic diagram for multi-link operation between APs with logical entities and a non-AP with logical entities, according to some aspects of the present disclosure.

FIG. 2C depicts an illustrative schematic diagram for multi-link operation between APs with logical entities and a non-AP with logical entities, according to some aspects of the present disclosure.

Referring to FIG. 2C, two multi-link logical entities 236 and 238 are shown. AP logical entity 236 may include physical and/or logical APs 240, 242, and 244 operating in different frequency bands (e.g., 2.4 GHZ, 5 GHZ, and 6 GHZ). APs 240, 242, and 244 can be the same as AP 102 and/or any one of APs 202 described above. Non-AP logical entity 238 may include STAs STA 246, STA 248, and STA 250, which may be the same as or similar to STAs 208, 210, 212, 230, 232, and/or 234.

AP 240 may communicate with STA 246 via link 252. AP 242 may communicate with STA 248 via link 254. AP 244 may communicate with STA 250 via link 256.

Multi-link AP logical entity 236 is shown in FIG. 2C to have access to a distribution system (DS) 258, which is a system used to interconnect a set of BSSs to create an extended service set (ESS). The multi-link AP logical entity 236 is also shown in FIG. 2C to have access a distribution system medium (DSM) 260, which is the medium used by a DS for BSS interconnections. Simply put, DS and DSM allow the AP to communicate with different BSSs.

It should be understood that although the example shows three logical entities within the multi-link AP logical entity and the three logical entities within the multi-link non-AP logical entity, this is merely for illustration purposes and that other numbers of logical entities with each of the multi-link AP and non-AP logical entities may be envisioned.

Because of the effect of terrain and obstacles, wireless signals propagate in multiple paths. To minimize or use the multipath effect, channel sounding is used to process a multidimensional spatial-temporal signal encountering these obstacles and determine channel characteristics. In channel sounding, a transmitter sends out a signal that excites, i.e., sounds, the channel. The output of the channel is observed by the receiver and stored. The channel's impulse response is obtained from the knowledge of the transmitted and received signal.

The sounding signal may be a broadband multi-tone test signal. At the receiver, the arriving signal is correlated with a local copy of the test signal. Due to the impulse-like auto-correlation function of the test signal, the correlator output provides the measured channel impulse response.

When many radio channels are available on a device, performing sounding on all those channels takes a significant amount of time. What is needed is a way of reducing the time for finding characteristics of all of the channels of a multi-channel device. MLO channel sounding on one channel can theoretically be extrapolated to another based on the channel impulse response. However, in practice, the individual radios on each MLO channel introduce impairments that break this extrapolation. For example, different radio interfaces have PLLs that come up in random polarity states (random 180 degree phase shifts between Tx paths) due in part on the dividers used in PLLs. Furthermore, it is possible to have unbalanced group delay across each Tx path or a mismatch between radios Tx paths.

An AP MLD such as AP MLD 236 and/or a non-AP MLD such as Non-AP MLD 238 may have multiple radio interfaces each associated with a different link (channel) such as a 2.4 GHz link, a 5 GHz link, a 6 GHz link, etc. Each radio interface in an AP MLD and/or a non-AP MLD may have a PLL for generating, stabilizing, modulating, demodulating, filtering, recovering, and/or otherwise processing signals received over communications channel. A PLL may utilize a divider. A divider may be used to divide a voltage controlled oscillator (VCO) frequency to phase frequency detector (PFD) frequency, which allows a PLL to generate output frequencies that are multiples of the PFD frequency. A divider may also be used in the reference path, which permits higher frequency references to be used than the PFD frequency.

Figure 3:
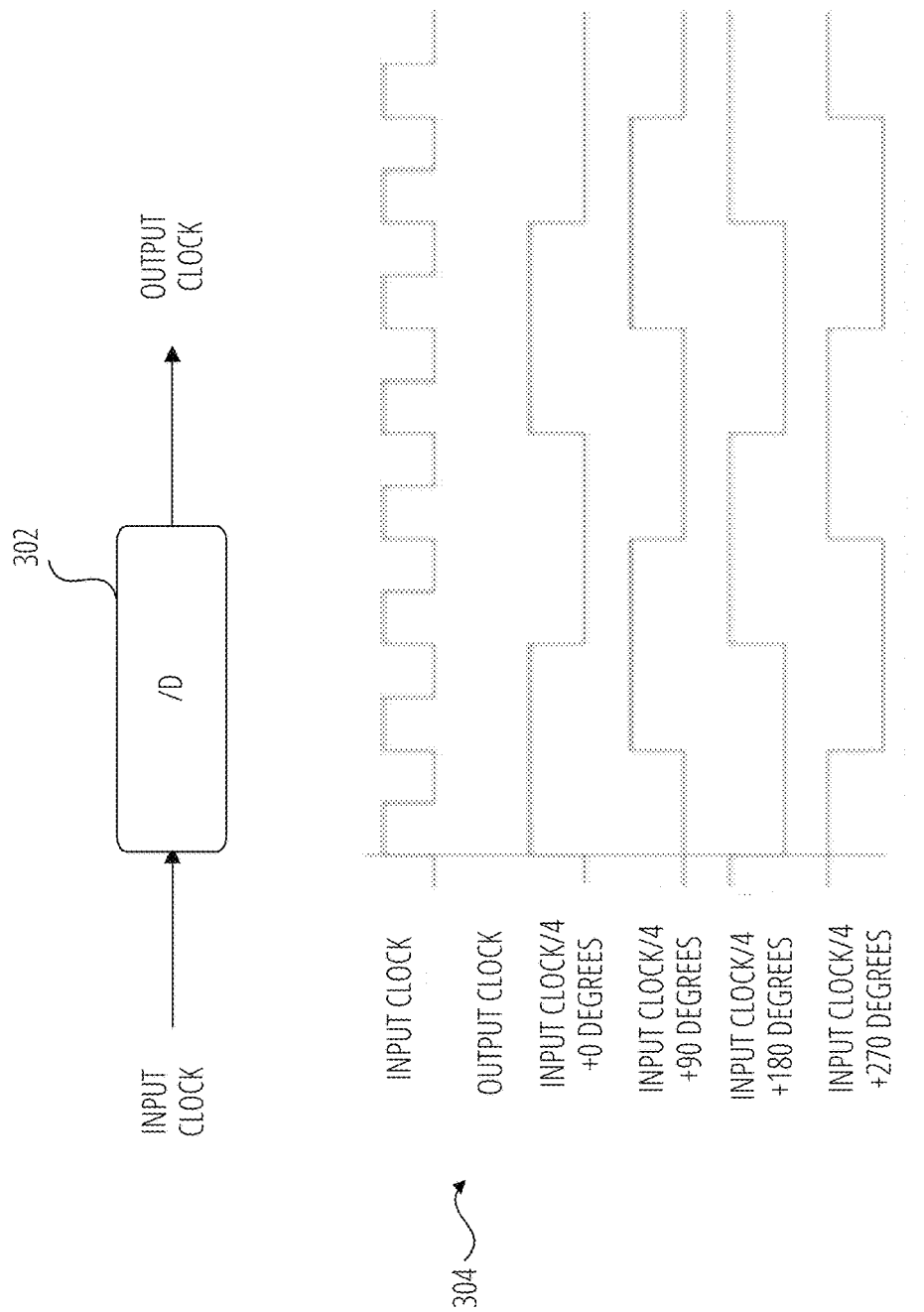
FIG. 3 is an example of phase uncertainties introduced due to divided clock signals, according to some aspects of the present disclosure.

An issue with dividers occurs when a clock is divided to a lower frequency. The division introduces phase uncertainties. FIG. 3 is an example of phase uncertainties introduced due to divided clock signals, according to some aspects of the present disclosure. Divider 302 may have a value D with an output clock having one of D possible phases with respect to input clock signal. These phase uncertainties as shown in plot 304 are caused when dividers start dividing the reference input clock signal at different edges and/or when the initial state of the dividers may have different starting values at power up.

Hereinafter, a process for inter-radio calibration is described to account for phase uncertainties identified above. This process may be performed simultaneously by multiple radio interfaces in MLD (e.g., a given AP MLD such as AP MLDs 236 and/or a non-AP MLD such as Non-AP MLDs 238. This process may be performed any time a given MLD shuts down, is powered back up, changes channels, and/or is impacted by external factors such as a temperature mandate (environmental condition parameter/mandate).

Figure 4:
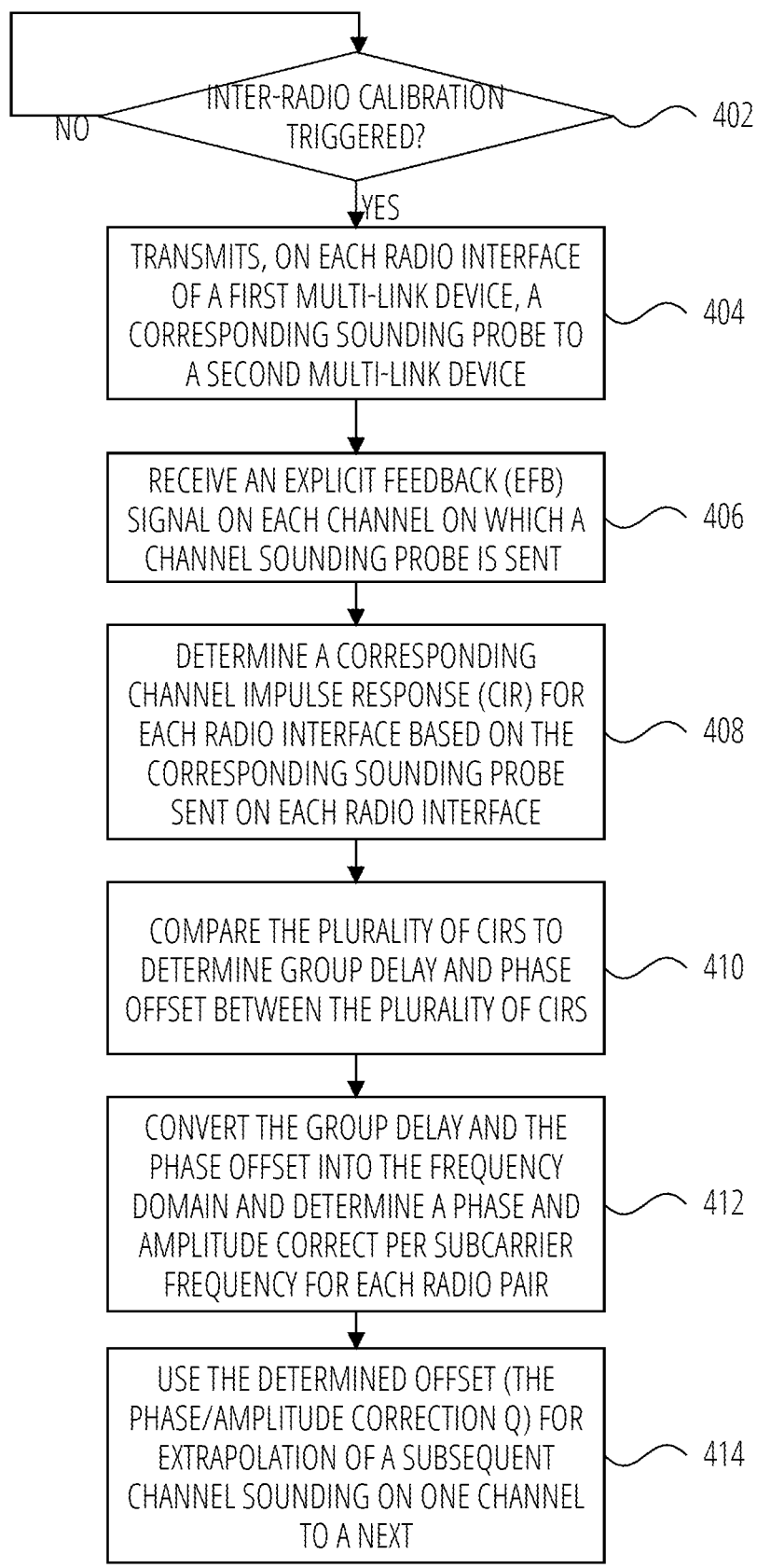
FIG. 4 is an example flow chart of a method for simultaneous multi-channel sounding to mitigate phase uncertainties, according to some aspects of the present disclosure.

FIG. 4 is an example flow chart of a method for simultaneous multi-channel sounding to mitigate phase uncertainties, according to some aspects of the present disclosure. Steps of example method of FIG. 4 will be described from the perspective of an MLD device such as AP MLDs 236 and/or Non-AP MLDs 238. It is noted that each such device may have one or more memories having computer-readable instructions stored therein and one or more processors. The one or more processors are configured to execute the computer-readable instructions to implement functionalities described below with reference to each step of FIG. 4.

At step 402, an MLD may determine if inter-radio calibration should be performed. As noted above, inter-radio calibration for correcting phase uncertainties may be performed any time the MLD shuts down, is powered back up, changes channels, and/or is impacted by external factors such as a temperature mandate.

If at step 402, the MLD determines that inter-radio calibration should not be performed, step 402 is repeated until such determination is made that the inter-radio calibration should be performed.

Upon determining that the inter-radio calibration should be determined, at step 404, the MLD, transmits, on each radio interface of the MLD (first multi-link device), a corresponding sounding probe to another MLD (a second multi-link device). For example, AP MLD 240 may operate on 3 channels (links), such as 2.4 GHZ, 5 GHZ, and 6 GHz. Accordingly, AP MLD 240 may send a channel sounding probe to non-AP MLD 246. The channel sounding probes on the different channels may be sent simultaneously.

At step 406, the MLD may receive an explicit feedback (eFB) signal on each channel on which a channel sounding probe is sent at step 404.

At step 408, the MLD may determine a corresponding channel impulse response (CIR) for each radio interface based on the corresponding sounding probe sent on each radio interface. For example, the MLD may determine each corresponding CIR by converting each eFB to a CIR for that radio interface. This will result in a plurality of CIRs (e.g., a CIR for the 2.4 GHZ channel, a CIR for the 5 GHz channel, a CIR for the 6 GHz channel, etc.). Conversion of eFBs to CIRs may be performed according to any known or to be developed method.

At step 410, the MLD may compare the plurality of CIRs to determine group delay and phase offset between the plurality of CIRs (each radio interface may estimate a difference between its respective CIR and the other ones of the plurality of CIRs).

At step 412, the MLD may convert the group delay and the phase offset into the frequency domain and determine a phase and amplitude correct per subcarrier frequency for each radio pair. This phase and amplitude offset may be determined as a parameter Q(n, m, k) for each transmission path between radio interfaces 'n' and 'm' for subcarrier 'k', where 'n' may be any of available channels on AP MLD 240 (e.g., 2.4 GHz, 5 GHZ, 6 GHZ, etc.), 'm' may be any of available channels on non-AP MLD 246 (e.g., 2.4 GHZ, 5 GHZ, 6 GHz, etc.), and k is the subcarrier frequency used within the 2.4 GHz, 5 GHZ, or 6 GHz frequency band between interfaces 'n' and 'm', as defined in the IEEE 802.11x standard.

As a non-limiting example, AP MLD 240 may have three radio interfaces A, B, and C, operating in the 2.4 GHZ, 5 GHZ, and 6 GHz bands respectively. Non-AP MLD 246 may have three radio interfaces E, F, and G operating in the 2.4 GHZ, 5 GHZ, and 6 GHZ bands respectively. AP MLD 240 may transmit three simultaneous channel sounding probes from interfaces A, B, and C, to interfaces E, F, and G of non-AP MLD 246, respectively. Therefore, the determined phase and amplitude correction values may be represented as Q(A, E, $k_{2.4\ GHz}$), Q(B, F, $k_{5\ GHz}$), Q(C, G, $k_{6\ GHz}$).

At step 414, the MLD may use the determined offset (the phase/amplitude correction Q) for extrapolation of a subsequent channel sounding on one channel to a next. For instance, the MLD may perform a different channel sounding on a particular channel (e.g., 2.4 GHZ, 5 GHZ, and/or 6 GHz). This subsequent different channel sounding may be performed because the MLD may have shut down, may have been powered up again after a shutdown, may have changed channels, may have gone through a reboot due to temperature mandates, etc. One such subsequent channel sounding is performed on any channel such as one of 2.4 GHZ, 5 GHZ, and 6 GHz channels, the corresponding Q parameter may be used to extrapolate the CIR for the channel on which sounding is performed to the remaining channels without having to perform independent channel sounding on the remaining channels.

In some aspects of the present disclosure, MLDs that can support multi-channel sounding as described above may advertise their ability to do. For instance, non-AP MLD 246 may advertise its support for multi-channel sounding to AP MLD 240 prior to AP MLD 240 choosing non-AP MLD 246 for sending sounding probes at step 402).

In another aspect, an MLD may be designed with a phase-matching PLL logic into divider 302 along with group delay matching logic on AP MLDs. Support for this optional feature can be advertised by the AP MLD(s) in a beacon. This matching support can be shown on a per-radio basis to cover matching between 5/6 GHz or some limited combinations of radio states. If this matching is supported between a set of radios in use, it can be used for extrapolation without perform the process of FIG. 4. If it is not support, process of FIG. 4 may be performed to eliminate group delay and phase inconsistencies for channel sounding extrapolation.

Figure 5:
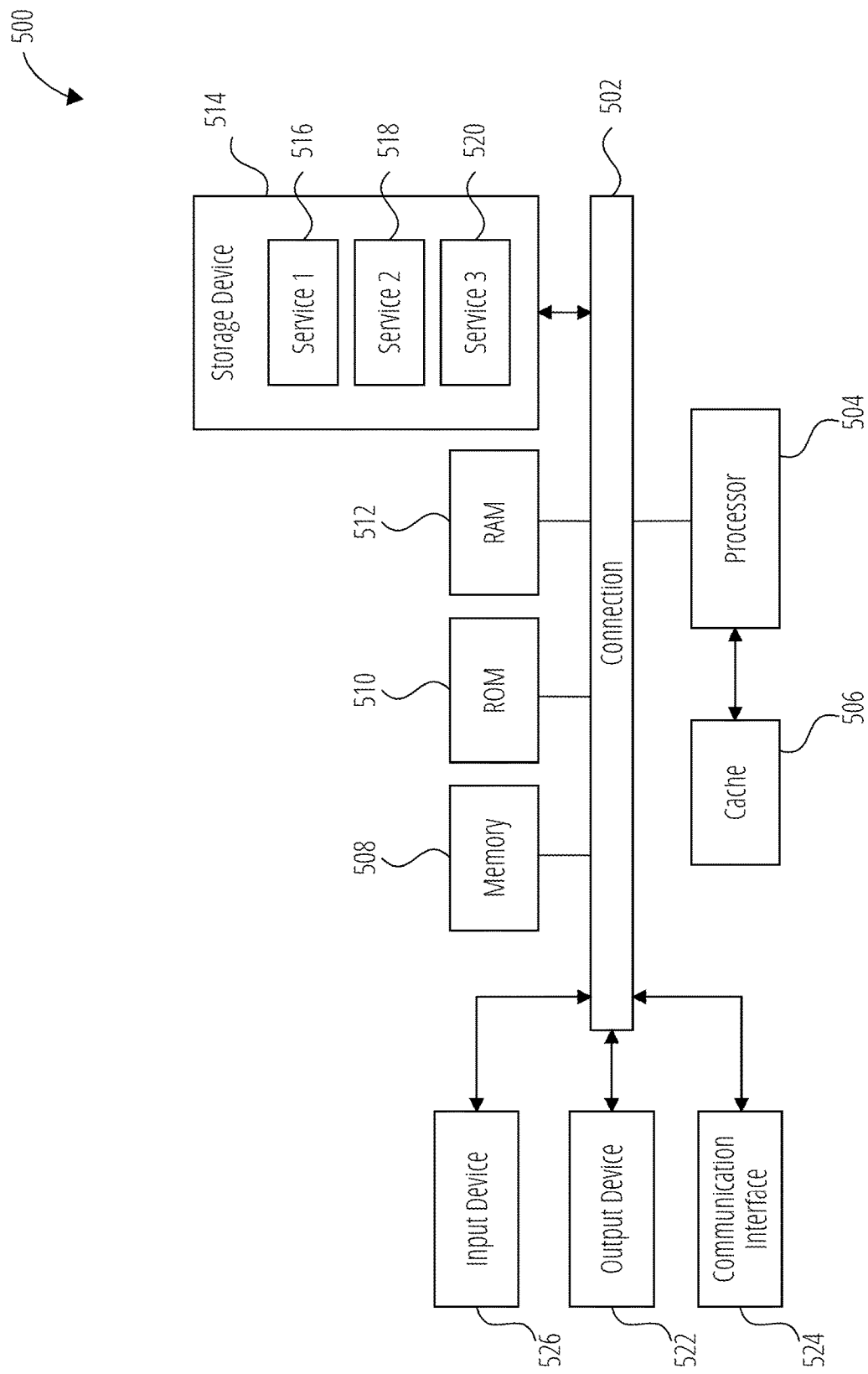
FIG. 5 shows an example of a system for implementing certain aspects of the present technology, according to some aspects of the present disclosure.

FIG. 5 shows an example of a system for implementing certain aspects of the present technology, according to some aspects of the present disclosure. FIG. 5 shows an example of computing system 500, which can be for example any MLD device performing process of FIG. 4 such as AP MLDs 236, non-AP MLDs 238 and/or any other network component described above with reference to FIGS. 1-4. Components of example system 500 may be in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) 504 and connection 502 that couples various system components including system memory 508, read-only memory (ROM) 510 and random access memory (RAM) 512 to processor 504. Computing system 500 can include a cache of high-speed memory 506 connected directly with, in close proximity to, or integrated as part of processor 504.

Processor 504 can include any general purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
   transmitting, on each radio interface of a first multi-link device, a corresponding sounding probe to a second multi-link device;
   determining, by each radio interface of the first multi-link device, a corresponding channel impulse response based on the corresponding sound probe to yield a plurality of channel impulse responses;
   determining an offset between the plurality of channel impulse responses; and
   using the offset during a subsequent extrapolation of a sounding probe on one radio interface to a second radio interface of the first multi-link device.

2. The method of claim 1, wherein determining the corresponding channel impulse response comprises:
   receiving a corresponding explicit feedback from the second multi-link device for each corresponding sounding probe; and
   converting the corresponding explicit feedback to the corresponding channel impulse response.

3. The method of claim 1, wherein the offset includes a group delay and a phase offset associated with the plurality of channel impulse responses.

4. The method of claim 1, further comprising:
   converting the offset into a frequency domain; and
   representing the offset, after conversion into the frequency domain, as an offset between a pair of radio interfaces over a subcarrier frequency.

5. The method of claim 1, further comprising:
   determining that inter-radio calibration is triggered; and
   transmitting the corresponding sounding probe each radio interface based on determining that the inter-radio calibration is triggered, the triggering being based on one or more of a shut down of the first multi-link device, a power up of the first multi-link device, a frequency channel change of the first multi-link device, and an environmental condition mandate.

6. The method of claim 1, wherein the corresponding sounding probe is transmitted simultaneously on all radio interfaces of the first multi-link device.

7. The method of claim 1, wherein each of the first multi-link device and the second multi-link device is one of an access point multi-link device or a non-access point multi-link device.

8. A multi-link device comprising:
   one or more memories having computer-readable instructions stored therein; and
   one or more processors configured to execute the computer-readable instructions to:
      transmit, on each radio interface of the multi-link device, a corresponding sounding probe to a different multi-link device;
      determine, by each radio interface of the multi-link device, a corresponding channel impulse response based on the corresponding sound probe to yield a plurality of channel impulse responses;
      determine an offset between the plurality of channel impulse responses; and
      use the offset during a subsequent extrapolation of a sounding probe on one radio interface to a second radio interface of the multi-link device.

9. The multi-link device of claim 8, wherein the one or more processors are configured to execute the computer-readable instructions to determine the corresponding channel impulse response by:
   receive a corresponding explicit feedback from the different multi-link device for each corresponding sounding probe; and convert the corresponding explicit feedback to the corresponding channel impulse response.

10. The multi-link device of claim 8, wherein the offset includes a group delay and a phase offset associated with the plurality of channel impulse responses.

11. The multi-link device of claim 8, wherein the one or more processors are configured to execute the computer-readable instructions to:
convert the offset into a frequency domain; and
represent the offset, after conversion into the frequency domain, as an offset between a pair of radio interfaces over a subcarrier frequency.

12. The multi-link device of claim 8, wherein the one or more processors are configured to execute the computer-readable instructions to:
determine that inter-radio calibration is triggered; and
transmit the corresponding sounding probe each radio interface based on determining that the inter-radio calibration is triggered, the triggering being based on one or more of a shut down of the multi-link device, a power up of the multi-link device, a frequency channel change of the multi-link device, and an environmental condition mandate.

13. The multi-link device of claim 8, wherein the corresponding sounding probe is transmitted simultaneously on all radio interfaces of the multi-link device.

14. The multi-link device of claim 8, wherein each of the multi-link device and the different multi-link device is one of an access point multi-link device or a non-access point multi-link device.

15. One or more non-transitory computer-readable media comprising computer-readable instructions, which when executed by one or more processors of a first multi-link device, cause the first multi-link device to:
transmit, on each radio interface of the first multi-link device, a corresponding sounding probe to a second multi-link device;
determine, by each radio interface of the first multi-link device, a corresponding channel impulse response based on the corresponding sound probe to yield a plurality of channel impulse responses;
determine an offset between the plurality of channel impulse responses; and
use the offset during a subsequent extrapolation of a sounding probe on one radio interface to a second radio interface of the first multi-link device.

16. The one or more non-transitory computer-readable media of claim 15, wherein the execution of the computer-readable instructions cause the first multi-link device to determine the corresponding channel impulse response by:
receiving a corresponding explicit feedback from the second multi-link device for each corresponding sounding probe; and
converting the corresponding explicit feedback to the corresponding channel impulse response.

17. The one or more non-transitory computer-readable media of claim 15, wherein the offset includes a group delay and a phase offset associated with the plurality of channel impulse responses.

18. The one or more non-transitory computer-readable media of claim 15, wherein the execution of the computer-readable instructions cause the first multi-link device to:
convert the offset into a frequency domain; and
represent the offset, after conversion into the frequency domain, as an offset between a pair of radio interfaces over a subcarrier frequency.

19. The one or more non-transitory computer-readable media of claim 15, wherein the execution of the computer-readable instructions cause the first multi-link device to:
determine that inter-radio calibration is triggered; and
transmit the corresponding sounding probe each radio interface based on determining that the inter-radio calibration is triggered, the triggering being based on one or more of a shut down of the first multi-link device, a power up of the first multi-link device, a frequency channel change of the first multi-link device, and an environmental condition mandate.

20. The one or more non-transitory computer-readable media of claim 15, wherein the corresponding sounding probe is transmitted simultaneously on all radio interfaces of the first multi-link device.

* * * * *